US009046998B2

(12) United States Patent
Mitsunaga et al.

(10) Patent No.: US 9,046,998 B2
(45) Date of Patent: Jun. 2, 2015

(54) CLOUD-BASED TRASH-CAN

(75) Inventors: Noriaki Mitsunaga, Yoa (JP); Kazushi Nishimoto, Kanazawa (JP); Naoki Kusakawa, Kyoto (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 273 days.

(21) Appl. No.: 13/813,333

(22) PCT Filed: Sep. 14, 2012

(86) PCT No.: PCT/US2012/055423
§ 371 (c)(1),
(2), (4) Date: Jan. 30, 2013

(87) PCT Pub. No.: WO2014/042648
PCT Pub. Date: Mar. 20, 2014

(65) Prior Publication Data
US 2014/0082537 A1 Mar. 20, 2014

(51) Int. Cl.
G06F 3/0486 (2013.01)
(52) U.S. Cl.
CPC .................... G06F 3/0486 (2013.01)
(58) Field of Classification Search
USPC ......................................... 715/769
See application file for complete search history.

(56) References Cited

U.S. PATENT DOCUMENTS

| RE40,949 E | * | 11/2009 | Davis et al. ........................... 1/1 |
| 7,831,560 B1 | * | 11/2010 | Spertus et al. ................ 707/639 |
| 8,055,698 B2 | * | 11/2011 | Gray et al. .................... 709/201 |
| 8,140,847 B1 | * | 3/2012 | Wu ................ 713/175 |
| 8,412,905 B2 | * | 4/2013 | Bryant-Rich ................ 711/170 |
| 8,521,789 B2 | * | 8/2013 | Marwah ........................ 707/803 |
| 2002/0083064 A1 | * | 6/2002 | Davis et al. .................... 707/100 |
| 2003/0016673 A1 | * | 1/2003 | Pendakur et al. ............. 370/394 |
| 2008/0183802 A1 | * | 7/2008 | Gray et al. .................... 709/203 |
| 2008/0228693 A1 | * | 9/2008 | Esser et al. ........................ 707/1 |
| 2012/0033251 A1 | * | 2/2012 | Okada et al. ................. 358/1.15 |
| 2012/0272257 A1 | * | 10/2012 | Pong et al. ....................... 725/13 |
| 2013/0198521 A1 | * | 8/2013 | Wu ................ 713/175 |
| 2013/0339937 A1 | * | 12/2013 | Meggison et al. ............. 717/168 |
| 2014/0047065 A1 | * | 2/2014 | Kim .............................. 709/217 |

OTHER PUBLICATIONS

International Search Report from International Application No. PCT/US2012/055423 mailed Nov. 20, 2012.
JR Rapheal, Astro Preps New Android Cloud Sync Service, ComputerWorld.com, Nov. 7, 2011, pp. 1-4.
Riad et al. "SEWOS: Bringing Semantics into Web Operating System," In: [online]. Dated May 2011. Retrieved on Oct. 31, 2012. URL:<htp://ijcsi.org/papers/IJCSI-8-3-1-515-521.pdf>.

* cited by examiner

*Primary Examiner* — Reza Nabi
(74) *Attorney, Agent, or Firm* — Brundidge & Stanger, P.C.

(57) ABSTRACT

Technologies are generally described for a cloud-based trash-can. In some examples, a method performed under control of a user device may include displaying a remote trash-can icon on a display of the user device, receiving a first user input that includes moving an icon representing a locally stored file to be discarded onto the remote trash-can icon, displaying on the display a request for a reason for discarding the locally stored file, and moving the discarded file to a server.

13 Claims, 8 Drawing Sheets

CLOUD-BASED TRASH-CAN

CROSS-REFERENCE TO RELATED APPLICATION

This Application is the National Stage filing under 35 U.S.C. §371 of PCT Application Ser. No. PCT/US12/55423 filed on Sep. 14, 2012. The disclosure of the PCT Application is hereby incorporated herein by reference in its entirety.

BACKGROUND

An icon for a trash-can or recycle bin on a computer desktop represents a folder that temporarily stores any files that are intended for deletion. Since a user who has deleted a file can change his/her mind and decide to recover the deleted file, many operating systems provide a trash-can function. In particular, some operating systems supporting graphical user interfaces (GUI), such as Apple Mac OS or Microsoft Windows, provide a trash-can icon, so that the user can easily delete a file by dragging and dropping the file to the trash-can icon.

SUMMARY

In an example, a method performed under control of a user device may include displaying a remote trash-can icon on a display of the user device, receiving a first user input that includes moving an icon representing a locally stored file to be discarded onto the remote trash-can icon, displaying on the display a request for a reason for discarding the locally stored file, and moving the discarded file to a server.

In an example, a method performed under control of a user device may include displaying a plurality of remote trash-can icons on a display of the user device, receiving a user input that includes moving an icon representing a locally stored file to be discarded onto one of the plurality of remote trash-can icons, and moving the discarded file to a server.

In an example, a method performed under control of a server may include receiving from a user device a file discarded on the user device, receiving from the user device a reason for discarding the file, and storing the file and the reason locally.

In an example, a user device may include a display configured to display a remote trash-can icon, a storage configured to store at least one file, a user input handling unit configured to receive a first user input that includes moving an icon representing at least one of the stored files to be discarded onto the remote trash-can icon, a control unit configured to generate a request for a reason for discarding the at least one file, the request being configured to be displayed on the display, and a transmitting unit configured to move the at least one discarded file to a server.

In an example, a user device may include a display configured to display a plurality of remote trash-can icons, a storage configured to store at least one file, a user input handling unit configured to receive a user input that includes moving an icon representing at least one of the stored files to be discarded onto one of the plurality of remote trash-can icons, and a transmitting unit configured to move the at least one discarded file to a server.

In an example, a server may include a receiving unit configured to receive from a user device a discarded file and a reason for discarding the discarded file, and a storage configured to store the discarded file and the reason.

In an example, a computer-readable storage medium may store thereon computer-executable instructions that, in response to execution, cause a user device to perform operations, including displaying a remote trash-can icon on a display of the user device, receiving a first user input that includes moving an icon representing a locally stored file to be discarded onto the remote trash-can icon, displaying on the display a request for a reason for discarding the locally stored file, and moving the discarded file to a server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
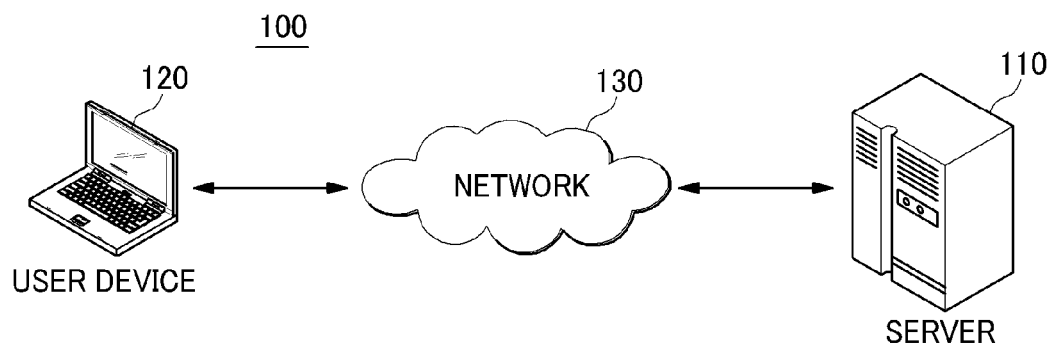
FIG. 1 schematically shows a cloud-based trash-can system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a cloud-based trash-can.

Technologies are generally described for a remote trash-can service provided by a server. In some examples, a user device, subscribing to the remote trash-can service provided by the server, may display a remote trash-can icon on a display thereof, so that a user of the user device may discard or delete a file from the user device and temporarily store the discarded file on the server, by dragging and dropping a file icon representing the file to be discarded onto the remote trash-can icon.

In some examples, when the user moves the file icon onto the remote trash-can icon, a user interface on the user device may display a request for a reason for discarding the file, for example, in a form of a dialog box. By way of example, but not limitation, the request may include an interactive menu that includes representations of various reasons for file deletion, such as, for example, "not interesting," "lack of local storage," "content duplication," and so on. In some examples, the menu of reasons may vary depending on a type of the file to be discarded. That is, the dialog box may provide a menu of reasons for discarding a document file that are different for those for discarding a picture file or a video file. These examples are not intended to be limiting.

In some examples, when the user responds to the request, the user device may send to the server the response of the user along with the file. In some examples, the user device may also send to the server file information including the file's name, contents, date of creation, location of creation, and/or date of last update, etc. In some examples, the user device may also send to the server information regarding the file deletion, including a time and/or a location of the user's action of discarding the file.

In some examples, the user device may display multiple remote trash-can icons on the display. The multiple remote trash-can icons may be respectively associated with different reasons for file deletion such as, for example, "not interesting," "lack of local storage," "content duplication," and so on, so that the user may selectively discard the file by dragging and dropping the file icon onto one of the remote trash-can icons. In some examples, when the user moves the file icon onto the one of the remote trash-can icons, the user device may send to the server the reason for file deletion associated with the corresponding remote trash-can icon, along with the file.

In some examples, when the server receives from the user device the file discarded on the user device and the reason for file deletion, the server may store the file and the reason thereon. In some examples, the server may also store the file information, including but not limited to the name, the contents, the date of creation, the location of creation, and/or the date of last update, which may be received from the user device. In some examples, the server may also store the information regarding the file deletion, including the time and/or the location of the user's action of discarding the file, which may be received from the user device.

In some examples, the server may examine the user's action of file deletion based on the reason for file deletion, and provide results of examination to other service providers and/or content providers. By way of example, but not limitation, when the user discards an application program, the server may provide the results of examination including the reason for file deletion to a developer of the discarded application program or other application developers interested in the examination. By way of example, but not limitation, when the user discards an image file, the server may provide the results of examination including the reason for file deletion and/or the file information to a photo retouching software developer and/or a digital camera manufacturer. By way of another example, but not limitation, when the user discards an audio file, the server may provide the results of examination including the reason for file deletion and/or the file information to a music content provider for trend detection and/or prediction. By way of yet another example, but not limitation, when certain files show a tendency of being discarded simultaneously, the server may provide the results of examination to a relevant software developer to develop a new application for handling these discarded files together. By way of example, but not limitation, when the user tends to simultaneously discard multiple photo files captured on a same day, the server may provide the results of examination to a photo management software developer, so as to develop an application managing photo files based on the capture dates of the respective photo files. By way of another example, but not limitation, when the user tends to simultaneously discard a video file, a music file, and an image file with a video making project file, the server may provide the results of examination to a video editing software, so as to develop an application having a function of deleting all the files related to the video making project file when the user deletes the video making project file.

FIG. 1 schematically shows a cloud-based trash-can system, arranged in accordance with at least some embodiments described herein.

As depicted, a cloud-based trash-can system 100 may include a server 110 and a user device 120. Server 110 and user device 120 may communicate with each other via a network 130. By way of example, but not limitation, the server may be managed or operated by a data center operator or a cloud-based storage provider. Examples of user device 120 may include, but are not limited to, a tablet, a smartphone, a mobile phone, a personal digital assistant (PDA), a mobile game console, a laptop computer, a desktop computer, or any other devices being able to access server 110. Examples of network 130 may include, but are not limited to, a local area network (LAN), a backbone network, a metropolitan area network (MAN), a wide area network (WAN), a virtual private network (VPN), an internetwork, etc.

Figure 2A:
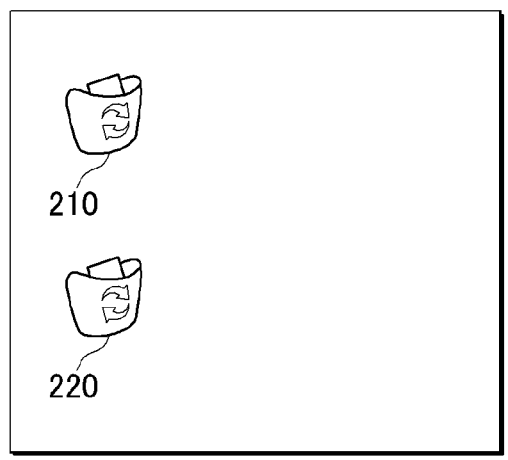
FIGS. 2(A) and 2(B) schematically show illustrative examples of screenshots of a user device displaying a remote trash-can icon, arranged in accordance with at least some embodiments described herein.

In some embodiments, when user device 120 subscribes to a cloud-based trash-can service provided on server 110, user device 120 may display a remote trash-can icon 210, in addition to or instead of a local trash-can icon 220, as depicted in FIG. 2(A). In such cases, when a user of user device 120 wants to discard a file from user device 120 and temporarily store the discarded file on server 110, the user may drag and drop, i.e., move, a file icon representing the file to be discarded onto remote trash-can icon 210, by using, for example, an external input device such as a mouse, a touch pad, a touch screen, a trackball and/or a drawing tablet, and/or via a voice command, depending on desired implementations. Meanwhile, when the user wants to discard the file but still temporarily store the discarded file on user device 120, the user may drag and drop the file icon onto local trash-can icon 220. In some embodiments, remote trash-can icon 210 may have a different color, shape and/or name from those of local trash-can icon 220, so that the two icons may be distinguished from each other.

Figure 2B:
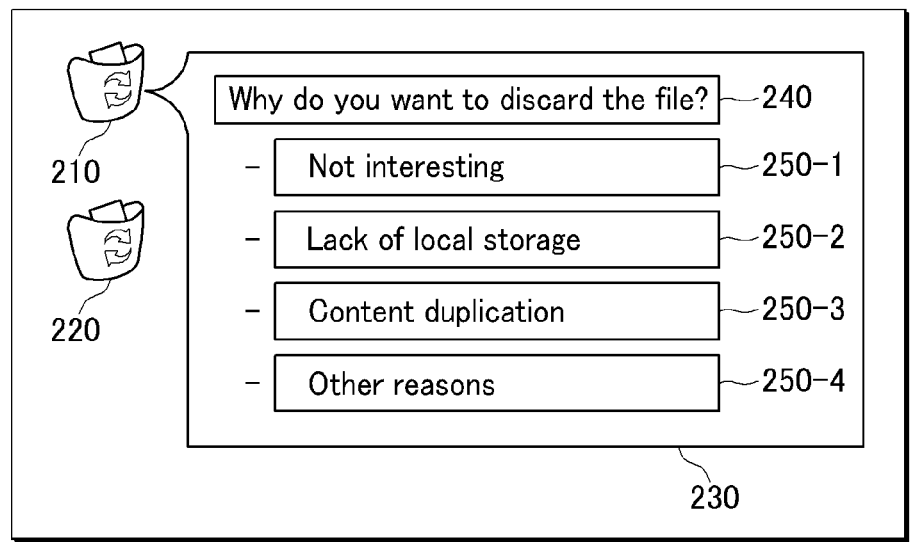

In some embodiments, when the user moves the file icon onto remote trash-can icon 210, a user interface on user device 120 may display a request for a reason for discarding the file, for example, in a form of a dialog box 230, as depicted in FIG. 2(B). Dialog box 230 may include a question 240 regarding a reason for discarding the file, and candidate answers 250-1, 250-2, 250-3 and 250-4, which may be representations of various reasons for discarding the file. By way of example, but not limitation, dialog box 230 may include question 240 of "why do you want to discard the file?" and candidate answers of "not interesting" (250-1), "lack of local storage" (250-2), "content duplication" (250-3), and "other reasons" (250-4).

In some embodiments, candidate answers 250-1, 250-2, 250-3 and 250-4 may vary depending on a type of the file to be discarded. By way of example, but not limitation, when the file to be discarded is a preinstalled application, candidate answers 250-1, 250-2, 250-3 and 250-4 may include at least one of "not interesting," "lack of local storage," "tried using but found useless," "found a bug," and so on. By way of example, but not limitation, when the file to be discarded is a photo, candidate answers 250-1, 250-2, 250-3 and 250-4 may include at least one of "camera not steady," "out of focus," "inadequate exposure," "unsatisfactory composition," and so on. Although FIG. 2(B) illustrates that dialog box 230 shows four candidate answers 250-1, 250-2, 250-3 and 250-4, it should be appreciated by one skilled in the relevant art that dialog box 230 may show any number of candidate answers depending on desired implementations.

In some embodiments, when the user makes a response to the request by selecting one of candidate answers 250-1, 250-2, 250-3 and 250-4, user device 120 may send to server 110 the response, i.e., the reason for discarding the file. In some embodiments, the user may be rewarded by the data center operator or the cloud-based storage provider, when making the response to the request. By way of example, but not limitation, when the user responds to the request, the user may get more storage space, get points for services provided by server 110 or other services, and so on.

In some embodiments, user device 120 may not always display dialog box 230 whenever the user moves the file icon onto remote trash-can icon 210. That is, user device 120 may adjust frequency of displaying of dialog box 230. In some embodiments, when the user prefers not to report reasons for discarding files to server 110, the user interface on user device 120 may forego displaying dialog box 230.

In some embodiments, user device 120 may also send to server 110 information about the discarded file. By way of example, but not limitation, the transmitted information about the discarded file may include at least one of a name, contents, a date of creation, a location of creation, and a date of last update.

In some embodiments, user device 120 may also send to server 110 information about the user's input or action of discarding the file. By way of example, but not limitation, the transmitted information about the user's input or action of discarding the file may include at least one of a time and a location of the user's input or action.

In some embodiments, user device 120 may also send to server 110 information about user device 120 such as, for example, a unique device identifier of user device 120. The information about user device 120 may include information regarding the user such as, for example, age, sex, place of residence, purchasing site, etc. of the user, that may be used for the aforementioned examination.

Figure 3:
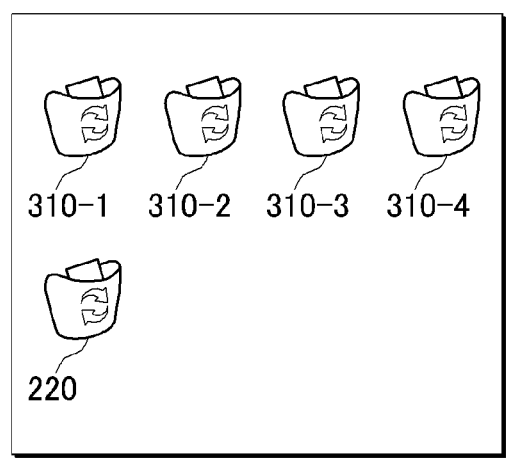
FIG. 3 schematically shows an illustrative example of a screenshot of a user device displaying multiple remote trash-can icons, arranged in accordance with at least some embodiments described herein.

In some embodiments, as depicted in FIG. 3, user device 120 may display multiple remote trash-can icons 310-1, 310-2, 310-3 and 310-4. Although FIG. 3 illustrates that user device 120 displays four remote trash-can icons 310-1, 310-2, 310-3 and 310-4, it should be appreciated by one skilled in the relevant art that user device 120 may display any number of remote trash-can icons depending on desired implementations.

In some embodiments, multiple remote trash-can icons 310-1, 310-2, 310-3 and 310-4 may be respectively associated with different reasons for discarding the file. By way of example, but not limitation, remote trash-can icon 310-1 may be associated with "not interesting," remote trash-can icon 320-2 may be associated with "lack of local storage," remote trash-can icon 320-3 may be associated with "content duplication," and remote trash-can icon 320-4 may be associated with "other reasons." The reasons for discarding the file may vary depending on a type of the file to be discarded, as described above with reference to FIG. 2(B). Alternatively, each of trash-can icons 310-1, 310-2, 310-3, and 310-4 may correspond to different types of discarded files, e.g., applications, documents, photos, videos.

In some embodiments, user device 120 may display multiple remote trash-can icons 310-1, 310-2, 310-3 and 310-4 with different colors, shapes and/or names, so that multiple remote trash-can icons 310-1, 310-2, 310-3 and 310-4 may be distinguished from one another.

In some embodiments, when the user wants to discard the file from user device 120 and temporarily store the discarded file in server 110, the user may select one of multiple remote trash-can icons 310-1, 310-2, 310-3 and 310-4 based on the reason for discarding the file, and drag and drop the file icon representing the file to be discarded onto the selected one of multiple remote trash-can icons 310-1, 310-2, 310-3 and 310-4. In such cases, user device 120 may send to server 110 the reason for discarding the file associated the selected one of multiple remote trash-can icons 310-1, 310-2, 310-3 and 310-4.

In some embodiments, user device 120 may also send to server 110 the information about the discarded file, the information about the user's input or action of discarding the file, and/or the information about user device 120, as described above with reference to FIGS. 2(A)-(B).

In some embodiments, server 110 may receive and store thereon the file discarded from user device 120 and the reason for discarding the file. In some embodiments, server 110 may also receive and store thereon the information about the discarded file, the information about the user's input or action of discarding the file, and/or the information about user device 120.

In some embodiments, server 110 may examine the reason for discarding the file, and at least one of the information about the file, the information about the user's input or action of discarding the file, and the information about user device 120, so that server 110, other service providers and/or content providers may utilize results of the examination.

Although the above examples with regard to FIGS. 1-3 illustrate that the user discards a file from user device 120 and temporarily stores the discarded file on server 110 by moving a file icon representing the file to be discarded onto remote trash-can icon 210 or remote trash-can icons 310-1, 310-2, 310-3 and 310-4, those skilled in the art will recognize that the user may also discard any data, which is not represented as a file, in a same or similar way. Those skilled in the art will also recognize that the user may also discard a file in server 110 and temporarily store the discarded file on server 110 in a same or similar way.

Figure 4:
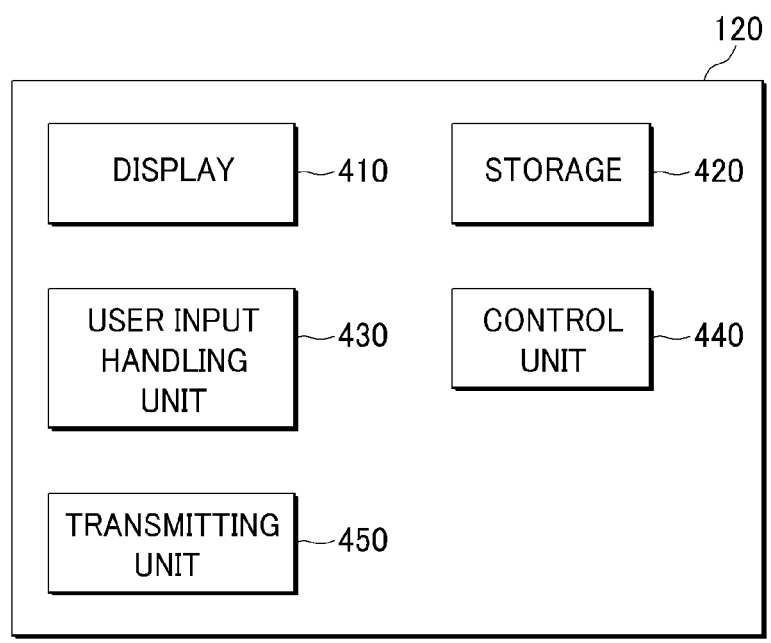
FIG. 4 shows a schematic block diagram illustrating an example architecture of a user device, arranged in accordance with at least some embodiments described herein.

FIG. 4 shows a schematic block diagram illustrating an example architecture of a user device, arranged in accordance with at least some embodiments described herein.

As depicted, user device 120 may include a display 410, a storage 420, a user input handling unit 430, a control unit 440, and a transmitting unit 450. Although illustrated as discrete components, various components may be divided into additional components, combined into fewer components, or eliminated while being contemplated within the scope of the disclosed subject matter.

Display 410 may be configured to display a remote trash-can icon (e.g., remote trash-can icon 210) or multiple remote trash-can icons (e.g., remote trash-can icons 310-1, 310-2, 310-3 and 310-4) on a user interface, depending on desired implementations. In some embodiments, the multiple remote trash-can icons may be respectively associated with different reasons for file deletion.

Storage 420 may be configured to store at least one file.

User input handling unit 430 may be configured to receive a first user input intended to discard a file from storage 420 and temporarily store the file in a cloud-based server such as server 110. In some embodiments, the first user input may include moving a file icon representing the file to be discarded onto remote trash-can icon 210 or one of multiple remote trash-can icons 310-1, 310-2, 310-3 and 310-4 displayed on display 410.

Control unit 440 may be configured to generate a request for a reason for discarding the file (e.g., dialog box 230), when user input handling unit 430 receives the first user input of moving the file icon onto remote trash-can icon 210. The request generated by control unit 440 may be displayed on display 410, and a response to the request may be received by user input handling unit 430 as a second user input.

Transmitting unit 450 may be configured to transmit or move the file to server 110. In some embodiments, transmitting unit 450 may be further configured to transmit to server 110 the reason for discarding the file (i.e., the second user input or one of the reasons for file deletion associated with the one of the multiple remote trash-can icons). In some embodiments, transmitting unit 450 may further transmit to server 110 at least one of information about the discarded file, information about the first and/or second user inputs, and information about user device 120.

Figure 5:
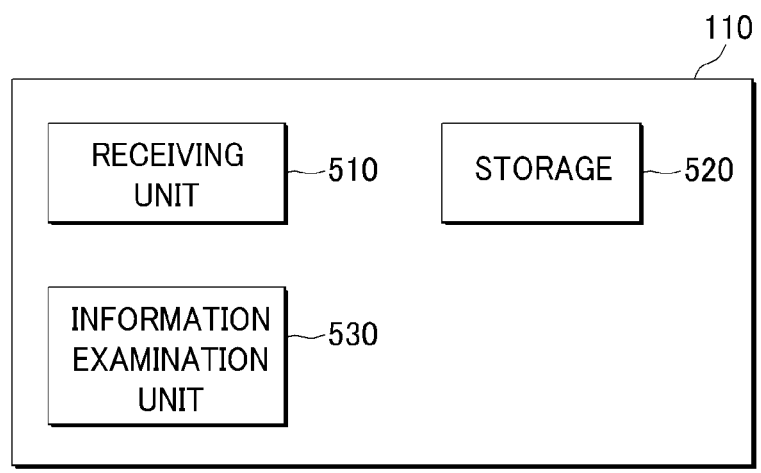
FIG. 5 shows a schematic block diagram illustrating an example architecture of a server, arranged in accordance with at least some embodiments described herein.

FIG. 5 shows a schematic block diagram illustrating an example architecture of a server, arranged in accordance with at least some embodiments described herein.

As depicted, server 110 may include a receiving unit 510, a storage 520, and an information examination unit 530. Although illustrated as discrete components, various components may be divided into additional components, combined into fewer components, or eliminated while being contemplated within the scope of the disclosed subject matter.

Receiving unit 510 may be configured to receive, from a user device such as user device 120, a file discarded from user device 120 and a reason for discarding the file. In some embodiments, receiving unit 510 may also receive from user device 120 at least one of information about the discarded file, information about the discarding of the discarded file, and information about user device 120.

Storage 520 may be configured to store the discarded file and the accompanying reason for being discarded. In some embodiments, when user device 120 requests restoration of the file, the discarded file stored in storage 520 may be transmitted to user device 120.

Information examination unit 530 may be configured to examine the reason for discarding the discarded file and the information received from user device 120. In some embodiments, examination results from information examination unit 530 may be provided to other service providers and/or content providers.

Figure 6:
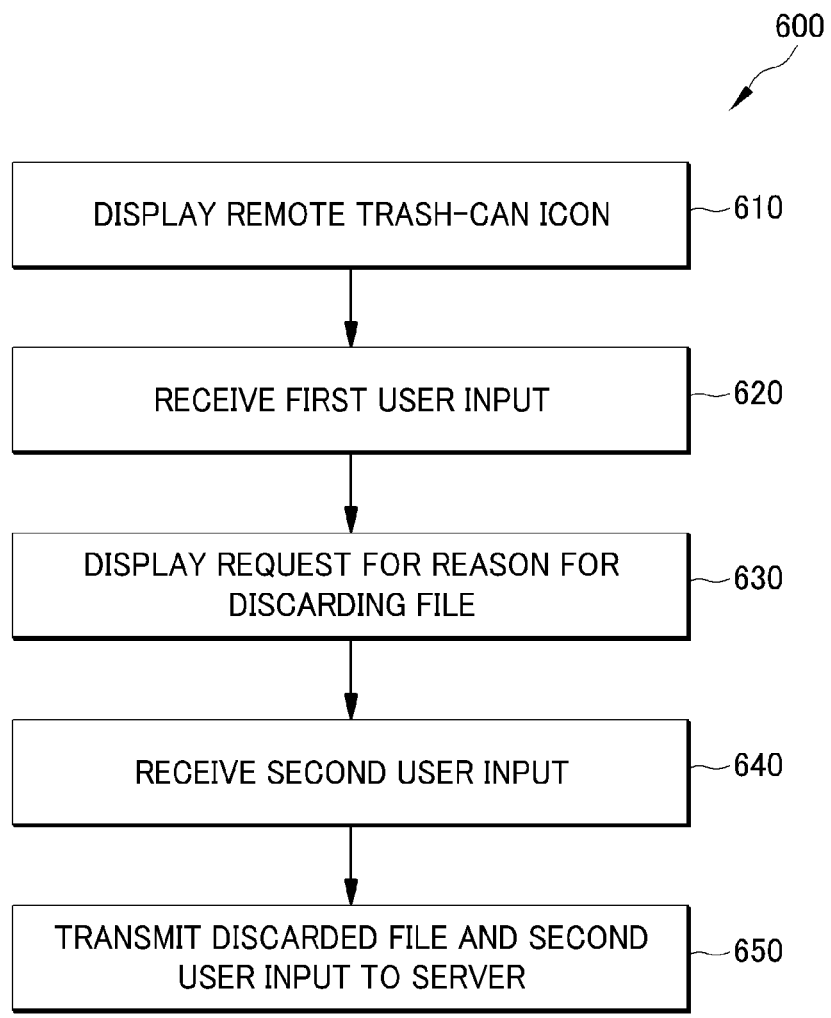
FIG. 6 shows an example flow diagram of a process performed under control of a user device for providing a remote trash-can function, arranged in accordance with at least some embodiments described herein.

FIG. 6 shows an example flow diagram of a process performed under control of a user device for providing a remote trash-can function, arranged in accordance with at least some embodiments described herein.

The process in FIG. 6 may be implemented in a user device, such as user device 120 including display 410, storage 420, user input handling unit 430, control unit 440 and transmitting unit 450 described above. An example process 600 may include one or more operations, actions, or functions as illustrated by one or more blocks 610, 620, 630, 640 and/or 650. Although illustrated as discrete blocks, various blocks may be divided into additional blocks, combined into fewer blocks, or eliminated, depending on the desired implementation. Processing may begin at block 610.

At block 610 (Display Remote Trash-Can Icon), the user device may display a remote trash-can icon (e.g., remote trash-can icon 210) on a display of the user device. The user device may display the remote trash-can icon in addition to a local trash-can icon or instead of the local trash-can icon. Processing may continue from block 610 to block 620.

At block 620 (Receive First User Input), the user device may receive a first user input intended to discard a locally stored file from the user device and temporarily store the file in a server (e.g., server 110). In some embodiments, the first user input may include moving an icon representing the file to be discarded onto the remote trash-can icon. Processing may continue from block 620 to block 630.

At block 630 (Display Request for Reason for Discarding File), the user device may display on the display a request for a reason for discarding the file. In some embodiments, the request may include an interactive menu including representations of various reasons for discarding the file. In some embodiments, the request may vary based at least in part on a type of the discarded file. Processing may continue from block 630 to block 640.

At block 640 (Receive Second User Input), the user device may receive a second user input that is a response to the request. Processing may continue from block 640 to block 650.

At block 650 (Transmit Discarded File and Second User Input to Server), the user device may transmit to the server the discarded file and the second user input. In some embodiments, the user device may also transmit to the server at least one of information about the discarded file (e.g., a name, contents, a date of creation, a location of creation, and/or a date of last update of the discarded file), information about the first user input (e.g., a time and/or a location of the first user input), and information about the user device (e.g., a device identifier of the user device).

Figure 7:
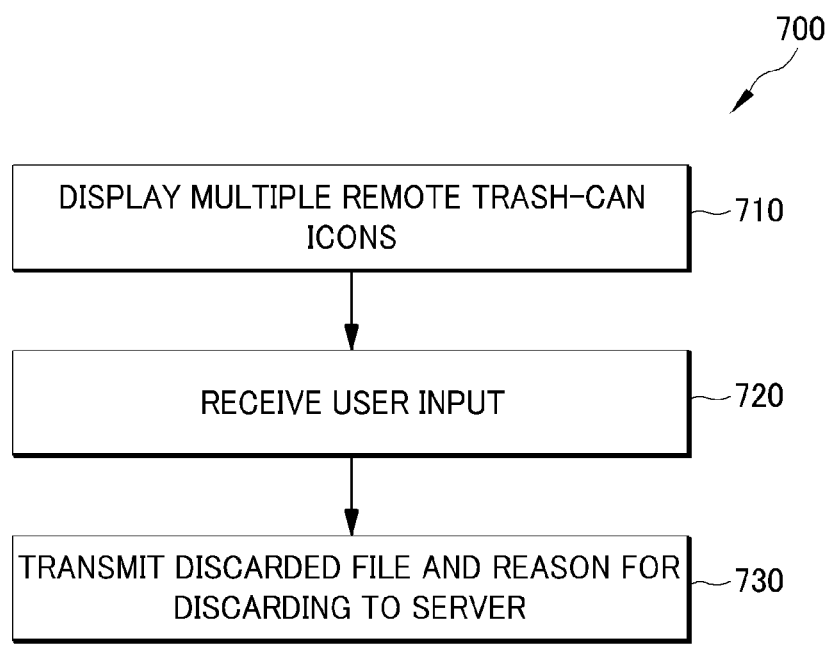
FIG. 7 shows another example flow diagram of a process performed under control of a user device for providing a remote trash-can function, arranged in accordance with at least some embodiments described herein.

FIG. 7 shows another example flow diagram of a process performed under control of a user device for providing a remote trash-can function, arranged in accordance with at least some embodiments described herein.

The process in FIG. 7 may be implemented in a user device, such as user device 120 including display 410, storage 420, user input handling unit 430 and transmitting unit 450 described above. An example process 700 may include one or more operations, actions, or functions as illustrated by one or more blocks 710, 720 and/or 730. Although illustrated as discrete blocks, various blocks may be divided into additional blocks, combined into fewer blocks, or eliminated, depending on the desired implementation. Processing may begin at block 710.

At block 710 (Display Multiple Remote Trash-Can Icons), the user device may display multiple remote trash-can icons (e.g., remote trash-can icons 310-1, 310-2, 310-3 and 310-4) on a display of the user device. In some embodiments, multiple remote trash-can icons may respectively relate to different reasons for discarding locally stored files. Processing may continue from block 710 to block 720.

At block 720 (Receive User Input), the user device may receive a user input intended to discard one of the locally stored files from the user device and temporarily store the file in a server (e.g., server 110). In some embodiments, the user input may include moving an icon representing the file to be discarded onto one of the multiple remote trash-can icons. Processing may continue from block 720 to block 730.

At block 730 (Transmit Discarded File and Reason for Discarding to Server), the user device may transmit to the server the discarded file and a reason for discarding the file that is related to the remote trash-can icon onto which the icon has been moved. In some embodiments, the user device may also transmit to the server at least one of information about the discarded file (e.g., a name, contents, a date of creation, a location of creation, and/or a date of last update of the discarded file), information about the user input (e.g., a time and/or a location of the user input), and information about the user device (e.g., a device identifier of the user device).

Figure 8:
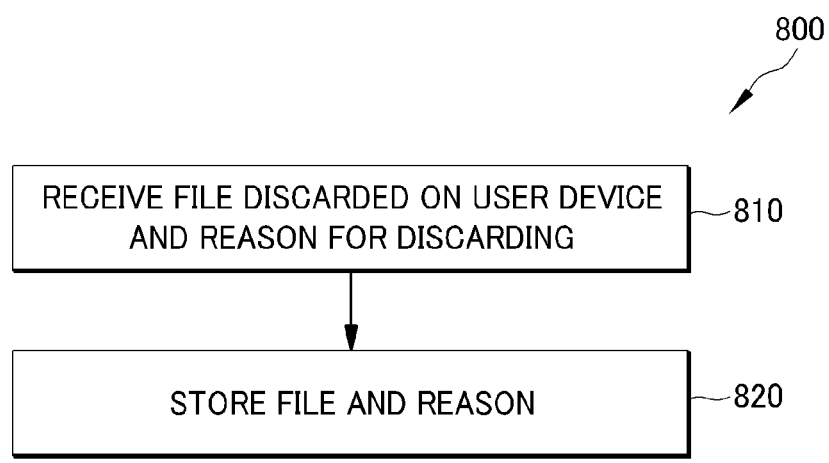
FIG. 8 shows an example flow diagram of a process performed under control of a server for providing a remote trash-can function, arranged in accordance with at least some embodiments described herein.

FIG. 8 shows an example flow diagram of a process performed under control of a server for providing a remote trash-can function, arranged in accordance with at least some embodiments described herein.

The process in FIG. 8 may be implemented in a server, such as server 110 including receiving unit 510, storage 520 and information examination unit 530 described above. An example process 800 may include one or more operations, actions, or functions as illustrated by one or more blocks 810 and/or 820. Although illustrated as discrete blocks, various blocks may be divided into additional blocks, combined into fewer blocks, or eliminated, depending on the desired implementation. Processing may begin at block 810.

At block 810 (Receive File Discarded on User Device and Reason for Discarding), the server may receive from a user device (e.g., user device 120) a file discarded on the user device and a reason for discarding the file. In some embodiments, the server may also receive from the user device at least one of information about the file (e.g., a name, contents, a date of creation, a location of creation, and/or a date of last update of the file), information about the discarding of the file (e.g., a time and/or a location of the discarding of the file by a user of the user device), and information about the user device (e.g., a device identifier of the user device), which may be used for additional analysis. Processing may continue from block 810 to block 820.

At block 820 (Store File and Reason), the server may store the received file together with the reason for discarding the file.

One skilled in the art will appreciate that, for these and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
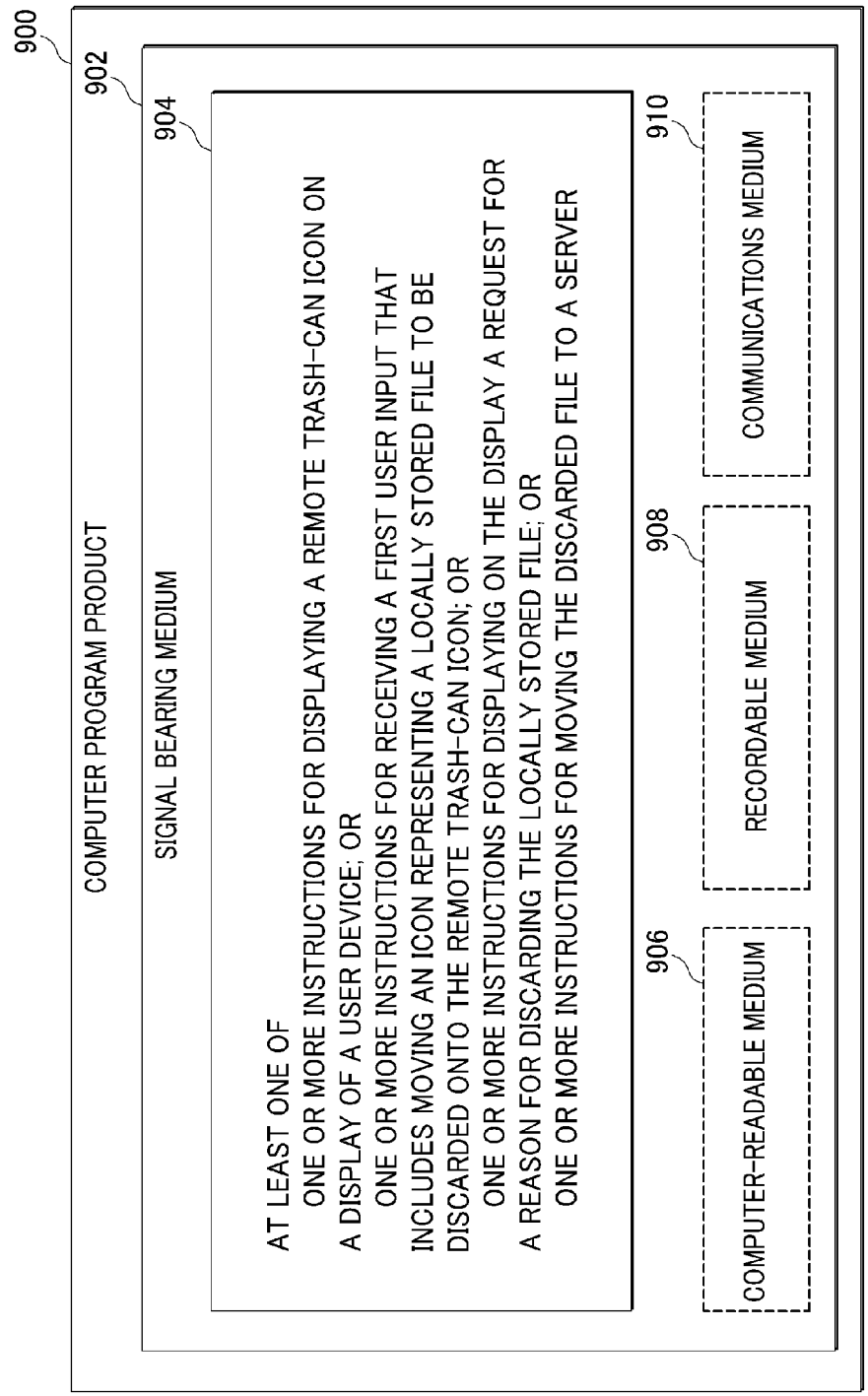
FIG. 9 illustrates example computer program products that may be utilized to provide a remote trash-can function, arranged in accordance with at least some embodiments described herein.

FIG. 9 illustrates example computer program products that may be utilized to provide a remote trash-can function, arranged in accordance with at least some embodiments described herein.

Program product 900 may include a signal bearing medium 902. Signal bearing medium 902 may include one or more instructions 904 that, when executed by, for example, a processor of a user device, may provide the functionality described above with respect to FIGS. 1-8. By way of example, instructions 904 may include: one or more instructions for displaying a remote trash-can icon on a display of the user device; one or more instructions for receiving a first user input that includes moving an icon representing a locally stored file to be discarded onto the remote trash-can icon; one or more instructions for displaying on the display a request for a reason for discarding the locally stored file; one or more instructions for moving the discarded file to a server. Thus, for example, referring to FIG. 4, user device 120 may undertake one or more of the blocks shown in FIGS. 6-7 in response to instructions 904.

In some implementations, signal bearing medium 902 may encompass a computer-readable medium 906, such as, but not limited to, a hard disk drive, a CD, a DVD, a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, program product 900 may be conveyed to one or more modules of user device 120 by an RF signal bearing medium 902, where the signal bearing medium 902 is conveyed by a wireless communications medium 910 (e.g., a wireless communications medium conforming with the IEEE 802.11 standard).

Figure 10:
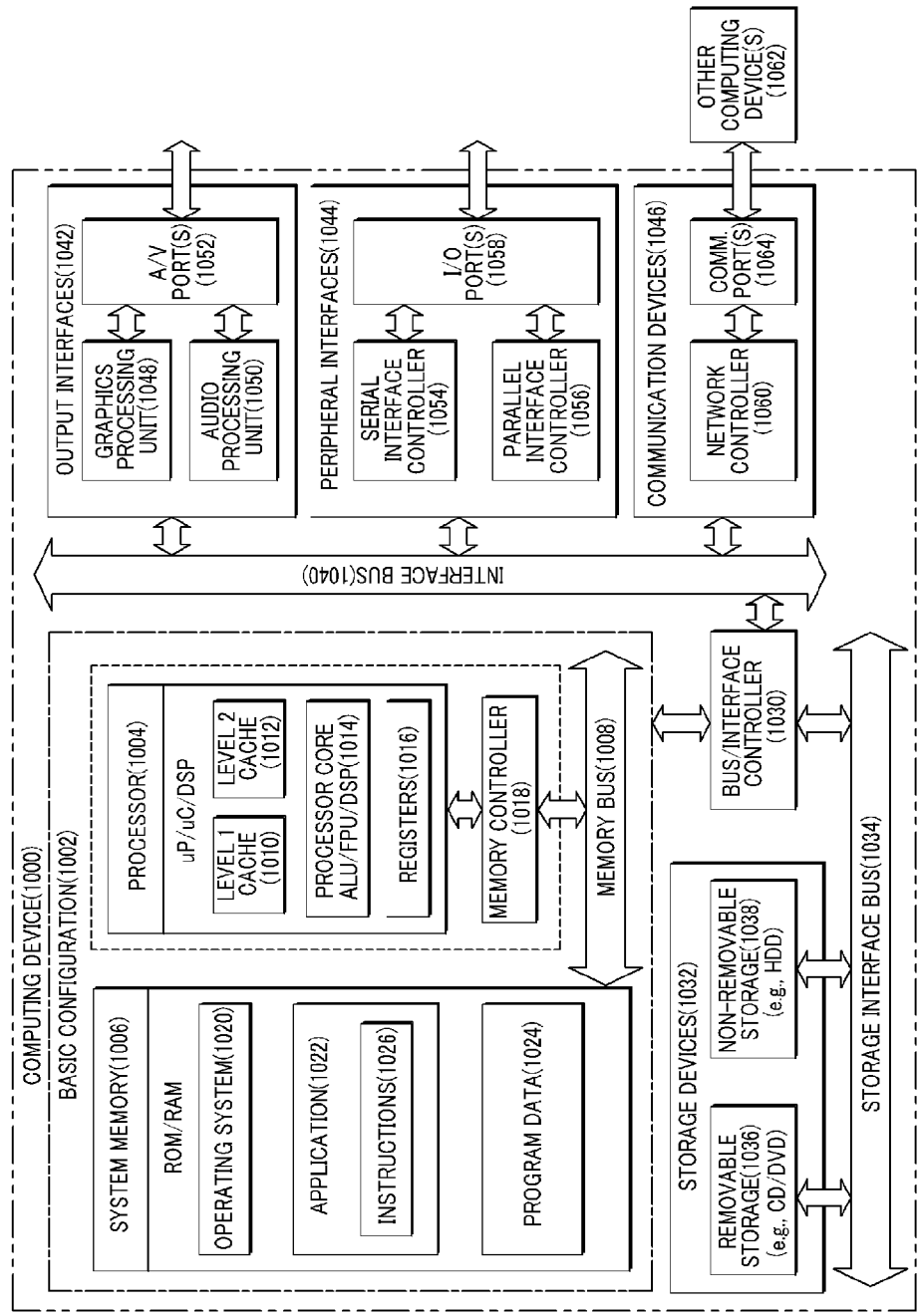
FIG. 10 is a block diagram illustrating an example computing device that may be utilized to provide a remote trash-can function, arranged in accordance with at least some embodiments described herein.

FIG. 10 is a block diagram illustrating an example computing device that may be utilized to provide a remote trash-can function, arranged in accordance with at least some embodiments described herein.

In these examples, elements of computing device 1000 may be arranged or configured for an electronic device. In a very basic configuration 1002, computing device 1000 typically includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller C), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include instructions 1026 that may be arranged to perform the functions as described herein including the actions described with respect to the user device 120 architecture as shown in FIG. 4 or including the actions described with respect to the flow charts shown in FIGS. 6-7. In some examples, application 1022 may be arranged to operate with program data 1024 on an operating system 1020 such that implementations for instructions for an electronic device as described herein.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a user device, comprising:
    displaying a plurality of remote trash-can icons on a display of the user device;
    receiving a first user input that includes moving an icon representing a locally stored file to be discarded onto one of the plurality of remote trash-can icons;
    displaying on the display a request for a reason for discarding the locally stored file,
        wherein the request includes an interactive menu that includes representations of various reasons for discarding the locally stored file;
    receiving a second user input that is a response to the request;
    transmitting the second user input to a server,
        wherein the second user input includes at least one of information regarding the discarded file, information regarding the first user input, or information regarding the user device; and
    moving the discarded file to the server,
        wherein the plurality of remote trash-can icons are respectively associated with the representations of various reasons.

2. The method of claim 1, wherein the request is based at least in part on a type of the discarded file.

3. The method of claim 1, wherein the information regarding the discarded file includes at least one of a name, contents, a date of creation, a location of creation, and a date of last update.

4. The method of claim 1, wherein the information about the first user input includes at least one of a time and a location of the first user input.

5. A user device, comprising:
    a processor;
    a display configured to display a plurality of remote trash-can icons;
    a storage configured to store at least one file;
    a user input handling unit configured to receive a first user input that includes moving an icon representing at least one of the stored files to be discarded onto one of the remote trash-can icons;
    a control unit configured to:
        generate a request for a reason for discarding the at least one file, the request being configured to be displayed on the display,
        wherein the request includes an interactive menu that includes representations of various reasons for discarding the locally stored file, and
        wherein the plurality of remote trash-can icons are respectively associated with the representations of various reasons;
    wherein the user input handling unit is further configured to receive a second user input that is a response to the request,
        wherein the second user input includes at least one of information regarding the discarded file, information regarding the first user input, or information regarding the user device; and
    a transmitting unit configured to:
        transmit the second user input to a server, and
        move the at least one discarded file to the server.

6. The user device of claim 5, wherein the request is based at least in part on a type of the at least one discarded file.

7. A method performed under control of a user device, comprising:
    displaying a plurality of remote trash-can icons on a display of the user device;
    receiving a first user input that includes moving an icon representing a locally stored file to be discarded onto one of the plurality of remote trash-can icons;
    displaying on the display a request for a reason for discarding the locally stored file,
        wherein the request includes an interactive menu that includes representations of various reasons for discarding the locally stored file, and wherein the representations of various reasons is based on a type of the discarded file;

receiving a second user input that is a response to the request;

transmitting the second user input to a server, wherein the second user input includes at least one of information regarding the discarded file, information regarding the first user input, or information regarding the user device; and moving the discarded file to the server, wherein the type of the discarded file includes applications, documents, photos and videos.

8. The method of claim 7, wherein the information about the file includes at least one of a name, contents, a date of creation, a location of creation, and a date of last update.

9. The method of claim 7, wherein the information about the first user input includes at least one of a time and a location of the first user input.

10. A non-transitory computer-readable medium storing instructions that, when executed, cause one or more processors to perform operations comprising:

displaying a plurality of remote trash-can icons on a user-interface displayed on a user device;

receiving a first user input that includes moving an icon representing a locally stored file to be discarded onto one of the plurality of remote trash-can icons;

displaying a request for a reason for discarding the locally stored file, wherein the request includes an interactive menu that includes representations of various reasons for discarding the locally stored file, and wherein the plurality of remote trash-can icons are respectively associated with the representations of various reasons;

receiving a second user input that is a response to the request;

transmitting the second user input to a server, wherein the second user input includes at least one of information regarding the discarded file, information regarding the first user input, or information regarding the user device; and moving the discarded file to the server.

11. The computer-readable medium of claim 10, wherein the request is based at least in part on a type of the discarded file.

12. The computer-readable medium of claim 10, wherein the information regarding the discarded file includes at least one of a name, contents, a date of creation, a location of creation, and a date of last update.

13. The computer-readable medium of claim 10, wherein the information about the first user input includes at least one of a time and a location of the first user input.

* * * * *

UNITED STATES PATENT AND TRADEMARK OFFICE
CERTIFICATE OF CORRECTION

PATENT NO. : 9,046,998 B2  
APPLICATION NO. : 13/813333  
DATED : June 2, 2015  
INVENTOR(S) : Mitsunaga et al.

It is certified that error appears in the above-identified patent and that said Letters Patent is hereby corrected as shown below:

Title Page, Item (75), under "Inventors", Line 1, delete "Noriaki Mitsunaga, Yoa (JP);" and insert -- Noriaki Mitsunaga, Yao (JP); --, therefor.

Specification

In Column 1, under "CROSS-REFERENCE TO RELATED APPLICATION", Lines 6-7, delete "35 U.S.C. §371" and insert -- 35 U.S.C. § 371 --, therefor.

In Column 10, Line 53, delete "a microcontroller C)," and insert -- a microcontroller (μC), --, therefor.

Signed and Sealed this  
First Day of December, 2015

Michelle K. Lee  
*Director of the United States Patent and Trademark Office*